United States Patent
Bloom

(10) Patent No.: US 7,544,387 B2
(45) Date of Patent: Jun. 9, 2009

(54) ADDITIVE PACKAGE FOR THERMOPLASTIC CONDENSATION POLYMERS

(76) Inventor: Joy Sawyer Bloom, 29 Country Gates Dr., Wilmington, DE (US) 19810

( * ) Notice: Subject to any disclaimer, the term of this patent is extended or adjusted under 35 U.S.C. 154(b) by 0 days.

(21) Appl. No.: 11/665,519

(22) PCT Filed: Oct. 20, 2005

(86) PCT No.: PCT/US2005/038012

§ 371 (c)(1),
(2), (4) Date: Apr. 11, 2007

(87) PCT Pub. No.: WO2006/045086

PCT Pub. Date: Apr. 27, 2006

(65) Prior Publication Data

US 2007/0299184 A1    Dec. 27, 2007

(51) Int. Cl.
*B05D 7/00* (2006.01)

(52) U.S. Cl. .................. 427/212; 427/215; 427/220

(58) Field of Classification Search .................. 524/437
See application file for complete search history.

(56) References Cited

U.S. PATENT DOCUMENTS

| | | | |
|---|---|---|---|
| 3,714,095 A | 1/1973 | Reischl et al. | |
| 4,083,946 A | 4/1978 | Schurr et al. | |
| 4,239,548 A | 12/1980 | Barnard et al. | |
| 4,246,378 A * | 1/1981 | Kometani et al. | 525/438 |
| 4,303,702 A | 12/1981 | Bullock, Jr. et al. | |
| 4,336,343 A * | 6/1982 | Aharoni | 523/455 |
| 4,499,219 A * | 2/1985 | Buxbaum et al. | 524/94 |
| 4,857,603 A * | 8/1989 | Akkapeddi et al. | 525/437 |
| 5,049,603 A * | 9/1991 | Mochizuki | 524/97 |
| 5,331,065 A * | 7/1994 | Po' et al. | 525/437 |
| 5,607,994 A * | 3/1997 | Tooley et al. | 524/265 |
| 5,631,310 A | 5/1997 | Tooley et al. | |
| 5,707,437 A * | 1/1998 | Niedenzu et al. | 106/446 |
| 5,807,932 A * | 9/1998 | Pfaendner et al. | 525/423 |
| 5,859,073 A | 1/1999 | Pfaendner et al. | |
| 5,889,090 A | 3/1999 | Tooley et al. | |
| 5,959,004 A | 9/1999 | Tooley et al. | |
| 6,153,264 A * | 11/2000 | Schmid et al. | 427/318 |
| 6,214,106 B1 * | 4/2001 | Weber et al. | 106/442 |
| 6,551,662 B1 * | 4/2003 | Schmid et al. | 427/318 |
| 6,590,069 B2 | 7/2003 | Nichols et al. | |
| 6,827,980 B2 * | 12/2004 | Schmid et al. | 427/318 |
| 7,101,590 B2 * | 9/2006 | Schmid et al. | 427/318 |
| 7,345,131 B2 | 3/2008 | Selbertinger et al. | |
| 2002/0177663 A1 * | 11/2002 | Cahill | 525/177 |
| 2003/0109644 A1 | 6/2003 | Davis et al. | |
| 2004/0048952 A1 * | 3/2004 | Mei et al. | 523/216 |
| 2004/0138381 A1 * | 7/2004 | Blasius et al. | 525/131 |
| 2004/0164437 A1 * | 8/2004 | Morton-Finger | 264/40.5 |
| 2005/0009985 A1 | 1/2005 | Selbertinger et al. | |
| 2005/0101210 A1 | 5/2005 | Bindschedler et al. | |
| 2007/0010618 A1 * | 1/2007 | Chen et al. | 525/65 |

FOREIGN PATENT DOCUMENTS

| | | |
|---|---|---|
| EP | 0393857 | 10/1990 |
| EP | 0430424 B1 | 2/1994 |
| EP | 1153966 A1 * | 11/2001 |
| EP | 1153966 A1 | 11/2001 |
| EP | 1316533 A2 | 11/2002 |
| EP | 1398409 A1 | 3/2004 |
| EP | 1496079 A1 | 1/2005 |
| GB | 2335197 A | 9/1999 |
| GB | 2342654 A | 4/2000 |
| JP | 2586783 B2 | 1/1994 |
| JP | 1997087491 A | 3/1997 |
| JP | 2002322354 A | 11/2002 |
| WO | WO97/07879 | 3/1997 |
| WO | WO 9707879 A1 * | 3/1997 |
| WO | WO00/44804 | 8/2000 |
| WO | WO02/10293 A2 | 2/2002 |
| WO | WO02/16468 A1 | 2/2002 |
| WO | WO02/102167 | 12/2002 |
| WO | WO03/013379 A2 | 2/2003 |
| WO | WO2004/046214 A2 | 6/2004 |
| WO | WO2005/007763 | 1/2005 |

OTHER PUBLICATIONS

International Search Report.
EPO Search Report.
International Search Report, May 2, 2006.
Villalobos et al, Johnson Polymer LLC "The Process of Recycling of Polyesters with Polymeric Chain Extenders" 2005.

* cited by examiner

*Primary Examiner*—Randy Gulakowski
*Assistant Examiner*—Robert Loewe

(57) ABSTRACT

The invention is directed to a thermoplastic condensation polymer chain extender additive package for reducing the molecular weight loss of a thermoplastic condensation polymer during a heated process comprising a chain extender composition selected from the group consisting of (a) a mixture of a chain extending agent and a water-bearing particulate material (b) a water-bearing particulate material surface treated with a chain extending agent or (c) a combination of (a) and (b). The water-bearing particulate material can be titanium dioxide pigment, the chain extending agent can be a multifunctional epoxy compound and the condensation polymer can be polyethylene terephthalate, polybutylene terephthalate or polycarbonate.

8 Claims, No Drawings

US 7,544,387 B2

ADDITIVE PACKAGE FOR THERMOPLASTIC CONDENSATION POLYMERS

BACKGROUND OF THE INVENTION

1. Field of the Invention

The invention relates to a chain extender additive package for thermoplastic condensation polymers. More particularly the invention relates to an additive package comprising a water-bearing particulate and a chain extending agent for reducing the molecular weight loss of a thermoplastic condensation polymer during a heated process, an improved method for reducing the molecular weight loss of a thermoplastic condensation polymer during a heated process and a method for forming a thermoplastic condensation polymer. Even more particularly, the invention relates to an additive package comprising titanium dioxide and a multifunctional epoxy chain extending agent for combining with thermoplastic condensation polymers.

2. Description of the Related Art

The melt extrusion of thermoplastic condensation polymers, such as polyethylene terephthalate (PET) polyester, into shaped structures such as tubing, pipe, wire coating or film is accomplished by well-known high temperature procedures wherein a rotating screw pushes the viscous polymer melt through an extruder barrel into a die in which the polymer is shaped to the desired form, and is then subsequently cooled and solidified into a product, that is, the extrudate, having the general shape of the die. In film blowing processes, as an extruded plastic tube emerges from the die the tube is continuously inflated by air, cooled, collapsed by rolls and wound up on subsequent rolls.

Chain extending agents are well-known thermoplastic condensation polymer additives that "zip-up" the polymer molecules, increasing molecular weight in the final polymer. Chain extending agents are often used in condensation polymer reactions in which the growth of a polymer chain proceeds by condensation reactions between molecules of all degrees of polymerization accompanied by the formation of low-molar-mass by-products(s). Chain extending agents are capable of reacting with the condensation polymers in such a way that diminishes molecular weight loss of the condensation polymer during subsequent heated processes such as injection molding and extrusion. Even though chain extending agents are capable of reducing condensation polymer molecular weight loss during thermal processes, molecular weight loss is still a problem.

SUMMARY OF THE INVENTION

This invention relates to improving the ability of a chain extending agent to reduce the molecular weight loss of a thermoplastic condensation polymer during thermal processing.

In one embodiment, the invention is directed to a thermoplastic condensation polymer chain extender additive package for reducing the molecular weight loss of a thermoplastic condensation polymer during a heated process comprising a chain extender composition selected from the group consisting of (a) a mixture of a chain extending agent and a water-bearing inert particulate material (b) a water-bearing particulate material surface treated with a chain extending agent or (c) a combination of (a) and (b).

In another embodiment, the invention is directed to an improved method for reducing the molecular weight loss of a thermoplastic condensation polymer during a heated process by carrying out the heated processes in the presence of a chain extender wherein the improvement comprises adding to the condensation polymer a chain extender additive package comprising (a) a mixture of a chain extending agent and a water-bearing inert particulate material (b) a water-bearing particulate material surface treated with a chain extending agent or (c) a combination of (a) and (b).

In yet another embodiment, the invention is directed to a method for forming a thermoplastic condensation polymer susceptible to molecular weight loss during a heated process, comprising:

introducing the thermoplastic condensation polymer to an extruder;

adding to the thermoplastic condensation polymer a chain extender composition consisting of (a) a mixture of the chain extending agent and a water-bearing particulate material (b) a water-bearing particulate material surface treated with the chain extending agent and (c) a combination of (a) and (b); and heat processing the thermoplastic condensation polymer in the extruder, wherein adding the chain extender composition reduces molecular weight loss of the thermoplastic condensation polymer during heat processing.

DETAILED DESCRIPTION OF THE INVENTION

The chain extender composition of the instant invention is in the form of (a) a mixture of a chain extending agent and a water-bearing particulate material (b) a water-bearing particulate material surface treated with a chain extending agent or (c) a combination of (a) and (b).

Examples of the chain-extending agents include epoxy compounds, acrylic and methacrylic acid-derived polymers and copolymers, polyols multifunctional acid anhydrides, polyacids, polyamines, isocyanates, phosphate esters, aziridines, oxazolines, multivalent metal compounds, and phosphite esters. These can be used either alone respectively or in combinations with each other.

One group of epoxy compounds are solid epoxy compounds known as Epon® resins available from Resolution Performance Products. Specific examples of epoxy compounds include a solid epoxy reaction product of epichlorohydrin and bisphenol-A with a viscosity at 25° C. in the range of 7-9.6 cP, a softening point of 174° F. and a weight per epoxide of 525-550 (Epon® 1001 sold by Resolution Performance Products) and another solid epoxy resin reaction product of epichlorohydrin and bisphenol-A with a viscosity at 25° C. in the range of 9.2-13.6 cP, a softening point of 185° F. and a weight per epoxide of 600-700 (Epon® 1002 sold by Resolution Performance Products), and a solid tetraglycidyl ether of tetraphenolethane with a viscosity at 25° C. of 39 P, a softening point of 172° F. and a weight per epoxide of 195-230 (Epon® 1031 sold by Resolution Performance Products). A still further example of an epoxy compound is a highly functional modified styrene acrylic polymer having a molecular weight of about 6,800 and an equivalent weight of 285 (Joncryl® ADR-4368 sold by Johnson Polymers). However, the epoxy compound is not especially limited, but is a compound having at least two epoxy groups per molecule. Examples include epoxy thermoplastic elastomers. Additional examples include (poly) ethylene glycol diglycidyl ether, (poly)propylene glycol diglycidyl ether, polytetramethylene glycol diglycidyl ether, resorcin diglycidyl ether, neopentyl glycol diglycidyl ether, 1,6-hexanediol diglycidyl ether, diglycidyl adipate, diglycidyl o-phthalate, diglycidyl terephthalate, hydroquinone diglycidyl ether, bisphenol S diglycidyl ether, glycerol diglycidyl ether, sorbitol polyglycidyl ether, sorbitan polyglycidyl ether, polyglycerol polyglycidyl ether, pentaerythritol polyglycidyl ether, diglycerol polyglycidyl ether, triglycidyl tris(2-hydroxyethyl)isocyanurate, glycerol triglycidyl ether, and trimethylolpropane polyglycidyl ether. Another additional epoxy compound is epoxidized soybean oil. These can be used either alone respectively or in combinations with each other.

Acrylic acid and methacrylic acid-derived polymers and copolymers are not especially limited. Examples of acrylic acids and methacrylic acids include olefin/glycidyl methacrylic acid (GMA) copolymers and methacrylic acid/acrylic acid copolymers, and other functionalized acrylic polymers and copolymers. Additional examples include diethylene glycol diacrylate, diethylene glycol dimethacrylate, triethylene glycol diacrylate, triethylene glycol dimethacrylate, tetraethylene glycol diacrylate, tetraethylene glycol dimethacrylate and the diacrylates or dimethacrylates of polyethylene glycol having a molecular weight of 1,500. Suitable chain extending agents also include vinyl esters of ethylenically unsaturated $C_3$-$C_6$-carboxylic acids, e.g. vinyl acrylate, vinyl methacrylate or vinyl itaconate. It is also possible to use vinyl esters of not less than dibasic saturated carboxylic acids and di- and polyvinyl ethers of not less than dihydric alcohols, e.g. divinyl adipate, butanediol divinyl ether or trimethylolpropane trivinyl ether. Further chain extending agents are allyl esters of ethylenically unsaturated carboxylic acids, e.g. allyl acrylate and allyl methacrylate, allyl ethers of polyhydric alcohols, e.g. pentaerythritol triallyl ether, triallyl sucrose and pentaallyl sucrose. It is also possible to use methylenebisacrylamide, methylenebismethacrylamide, N-divinylethyleneurea, divinylbenzene, divinyldioxane, tetraallyl silane and tetravinyl silane as chain extending agents. These can be used either alone respectively or in combinations with each other.

Examples of polyols include aliphatic diols or polyols that can have up to 20 carbon atoms, typically having from 6 to 20 carbon atoms, such as ethylene glycol, diethylene glycol, propylene glycol, dipropylene glycol, 1,4-butanediol, 1,5-pentanediol, neopentyl glycol, 1,6-hexanediol, 2-methyl-1,5-pentanediol, 2-ethyl-1,4-butanediol, 2,2-bis(4'-hydroxycyclohexyl)propane, dimethylolcyclohexane, glycerol, trimethylolethane, trimethylolpropane, trimethylolbutane, pentaerythritol, trimethylolpropane, erythritol and sorbitol. These can be used either alone respectively or in combinations with each other.

Examples of polyamines can have up to 20 carbon atoms, such as ethylenediamine, 1,3-propanediamine, 1,2-propanediamine, neopentanediamine, hexamethylenediamine, octamethylenediamine, isophoronediamine, 4,4'-diaminodicyclohexylmethane, 3,3'-dimethyl-4,4'-diaminodicyclohexylmethane, 4,7-dioxadecane-1,10-diamine(3,3'-bis[1,2-ethanediylbis(oxy)]-1-propanamine), 4,9-dioxadodecane-1,12-diamine (3,3'-bis[1,3-butanediylbis(oxy)]-1-propanamine), 4,7,10-trioxamidecane-1,13-diamine(3,3'-bis[oxybis(2,1-ethanediyloxy)]-1-propanamine), 2-(ethylamino) ethylamine, 3-(methylamino)propylamine, diethylenetriamine, N(3)Amine(N-(2-aminoethyl)-1,3-propylenediamine), dipropylenetriamine or N(4)Amine(N,N'-bis(3-aminopropyl)ethylenediamine); alkanolamines having up to 20 carbon atoms, such as monoethanolamine, 2-amino-1-propanol, 3-amino-1-propanol, 2-amino-1-butanol, isopropanolamine, 2-amino-2-methyl-1-propanol, 5-amino-1-pentanol, 2-amino-1-pentanol, 6-aminohexanol, methylaminoethanol, 2-(2-aminoethoxy)ethanol, N-(2-aminoethyl)ethanolamine, N-methylethanolamine, N-ethylethanolamine, N-butylethanolamine, diethanolamine, 3-(2-hydroxyethylamino)-1-propanol or diisopropanolamine. These can be used either alone respectively or in combinations with each other.

The multifunctional acid anhydride is not especially limited, but examples thereof include pyromellitic dianhydride, benzophenonetetracarboxylic dianhydride, butane-1,2,3,4-tetracarboxylic dianhydride, maleic anhydride homopolymers, maleic anhydride-vinyl acetate copolymers, maleic anhydride-ethylene copolymers, maleic anhydride-isobutylene copolymers, maleic anhydride-isobutyl vinyl ether copolymers, maleic anhydride-acrylonitrile copolymers, and maleic anhydride-styrene copolymers. These can be used either alone respectively or in combinations with each other.

The aziridine compound is not especially limited, but examples thereof include 2,2'-bishydroxymethylbutanol-tris [3-(1-aziridinyl)propionate], ethylene glycol-bis[3-(1-aziridinyl)propionate], polyethylene glycol-bis[3-(1-aziridinyl)propionate], propylene glycol-bis[3-(1-aziridinyl)propionate], polypropylene glycol-bis[3-(1-aziridinyl)propionate], tetramethylene glycol-bis[3-(1-aziridinyl)propionate], polytetram ethylene glycol-bis[3-(1-aziridinyl)propionate], N,N'-tetramethylenebisethyleneurea, N,N'-pentamethylenebisethyleneurea, N,N'-hexamethylenebisethyleneurea, N,N'-heptamethylenebisethyleneurea, N,N'-octamethylenebisethyleneurea, N,N'-phenylenebisethyleneurea, N,N'-tolylenebisethyleneurea, N,N'-diphenyl-4,4'-bisethyleneurea, 3,3'-dimethyldiphen 3,3'-dimethoxydiphenyl-4,4'-bisethyleneurea, and diphenylmethane-p,p-bisethyleneurea. These can be used either alone respectively or in combinations with each other.

The oxazoline compound is not especially limited, but examples thereof include 2-oxazoline, 2-methyl-2-oxazoline, 2-ethyl-2-oxazoline, 2-isopropyl-2-oxazoline, 2-butyl-2-oxazoline, 2-phenyl-2-oxazoline, 2,2'-trimethylene-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2, 2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2-oxazolinylcyclohexane) sulfide, and bis-(2-oxazolinyinorbornane)sulfide. These can be used either alone respectively or in combinations with each other.

The isocyanates are not especially limited, but a compound having at least two isocyanate groups per molecule would be useful. Examples thereof include: isocyanate compounds such as tolylene diisocyanate (which might be referred to as "TDI"), 4,4'-diphenylmethane diisocyanate (which might be referred to as "MDI"), hexamethylene diisocyanate, xylylene diisocyanate, metaxylylene diisocyanate, 1,5-naphthalene diisocyanate, hydrogenated diphenylmethane diisocyanate, hydrogenated tolylene diisocyanate, hydrogenated xylylene diisocyanate, and isophorone diisocyanate; biuret polyisocyanate compounds such as Sumidur N (produced by Sumitomo-Bayer Urethane Co., Ltd.); polyisocyanate compounds having an isocyanurate ring, such as Desmodur IL and HL (produced by Bayer A. G.) and Colonate EH (produced by Nippon Polyurethane Kogyo Co., Ltd.); adduct polyisocyanate compounds such as Sumidur L (produced by Sumitomo-Bayer Urethane Co., Ltd.); and adduct polyisocyanate compounds such as Colonate HL (produced by Nippon Polyurethane Kogyo Co., Ltd.). In addition, blocked isocyanates would also be examples. These can be used either alone respectively or in combinations with each other.

The multivalent metal compound is not especially limited, but examples thereof include organometallic compounds, metal salts and/or metal alkoxides having valencies of not less than 2.

Examples of metals in the organometallic compounds and/or metal salts having valencies of not less than 2 include zinc, calcium, copper, iron, magnesium, cobalt, and barium. More examples include multivalent metal compounds of which the counter anions can be separated and recovered as volatiles from the reaction system after neutralization, such as zinc(II) acetylacetonate, zinc acetate, zinc formate, zinc propionate, and zinc carbonate. These can be used either alone respectively or in combinations with each other.

Examples of the metal alkoxides include aluminum isopropoxide, mono-sec-butoxyaluminum diisopropylate, aluminum ethylate, tetraisopropoxytitanium, tetra-n-butoxytitanium, tetra(2-ethylhexyloxy)titanium, and tetrastearyloxytitanium. These can be used either alone respectively or in combinations with each other.

The phosphate or phosphite ester is not especially limited, but may be either a diester or triester. Examples of the ester group include methyl, ethyl, propyl, butyl, phenyl, and 2-ethylhexyl, but methyl, ethyl, and phenyl. These can be used either alone respectively or in combinations with each other.

Further examples of chain extending agents include oligomeric compounds having two or more of the abovementioned reactive functional groups, examples being hydroxyl-containing oligomers, such as polyethers, polyesters or hydroxyl-containing acrylate/methacrylate copolymers. Oligomeric chain extending agents are extensively described in the literature and generally have molecular weights in the range from 200 to 2000 daltons. These can be used either alone respectively or in combinations with each other.

The water-bearing particulate material can include any one of a wide variety of fillers or pigments which are typically used in a thermoplastic condensation polymer. Suitable fillers include calcium carbonate, clays, talcs, zinc oxide, titanium dioxide, silica and the like. Typically the particulate material itself is inert with respect to the thermoplastic polymer.

An especially useful water-bearing particulate material is titanium dioxide. Water can constitute about 0.3 to about 1% by weight of the titanium dioxide, based on the entire weight of the titanium dioxide.

Titanium dioxide ($TiO_2$) pigment useful in the present invention may be in the rutile or anatase crystalline form. It is commonly made by either a chloride process or a sulfate process. In the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference.

By "pigment" it is meant that the titanium dioxide particles have an average size of less than 1 micron. Preferably, the particles have an average size of from 0.020 to 0.95 microns, more preferably, 0.050 to 0.75 microns and most preferably 0.075 to 0.50 microns. Pigments with a specific gravity in the range of about 3.5 to about 6 g/cc can be used.

If the pigment is titanium dioxide it may be substantially pure titanium dioxide or may contain other metal oxides, such as silica, alumina, silica-alumina and/or zirconia. Other metal oxides may become incorporated into the pigment particles for example, by co-oxidizing or co-precipitating titanium compounds with other metal compounds. If co-oxidized or co-precipitated metals are present, they are preferably present in an amount 0.1 to 20 wt %, as the metal oxide, preferably, 0.5 to 5 wt %, more preferably 0.5 to 1.5 wt % based on the total pigment weight.

The titanium dioxide pigment may also bear one or more metal oxide surface coatings. These coatings may be applied using techniques known by those skilled in the art. Examples of metal oxide coatings include silica, alumina, zirconia among others. Such coatings may be present in an amount of 0.1 to 10 wt %, based on the total weight of the pigment, preferably 0.5 to 3 wt %.

The titanium dioxide pigment can be surface treated. By "surface treated" it is meant titanium dioxide pigment particles that have been contacted with the compounds described herein wherein the compounds are adsorbed on the surface of the titanium dioxide particle or, a reaction product of at least one of the compounds with the titanium dioxide particle is present on the surface as an adsorbed species or chemically bonded to the surface. The compounds or their reaction products or combination thereof may be present as a coating, either single layer or double layer, continuous or non-continuous, on the surface of the pigment.

The pigment can be surface treated with a variety of materials including silanes, siloxanes, polysiloxanes, hydrocarbon waxes or carboxylic acids.

Examples of silanes are those in which at least one substituent group of the silane contains an organic substituent. The organic substituent can contain heteroatoms such as, but not limited to, oxygen or halogen. Typical examples of suitable silanes include, without limit, alkoxy silanes and halosilanes having the general formula $R^1_x Si(R^2)_{4-x}$, wherein $R^1$ is a nonhydrolyzable group and $R^2$ is a hydrolyzable group and x=1 to 3. The nonhydrolyzable group will not react with water to form a different group. The hydrolysable group will react with water to form one or more different groups, which become adsorbed or chemically bonded to the surface of the titanium dioxide particle. Typically, $R^1$ is an alkyl, cycloalkyl or aromatic group having at least 1 to about 20 carbon atoms; preferably $R^1$ is an alkyl group having 8 to 18 carbon atoms. Typically, $R^2$ is an alkoxy group having about 1 to about 4 carbon atoms, preferably, ethoxy or methoxy; a halogen, such as chloro or bromo; or acetoxy or hydroxy or mixture thereof. Preferably $R_2$ is chloro, methoxy, ethoxy, hydroxy, or mixture thereof.

For example, silanes useful in carrying out the invention include octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane, methyl triethoxysilane, dimethyl diethoxy silane and triethoxypropyl silane. More typically, the silane is octyltriethoxysilane or octadecyltriethoxysilane, most typically, the silane octyltriethoxysilane. Examples of halosilanes that may be useful include chlorosilane and chloromethylsilane. Additional examples of potentially useful silanes include 2-ethyl-2-methyldisilane, 1-ethoxy-2-silyltrisilane, 2-methyldisilanecarboxylic acid, benzylsilanediol, bromosilane, (trimethylsilyl)cyclohexane, cyclopentasilane, and silacyclohexane.

Examples of siloxanes include hydridosiloxanes and alkylhydridosiloxanes in which the alkyl group contains from 1 to about 20 carbon atoms. Specifically methylhydridosiloxanes can be useful such as compounds having the formula $Me_3SiO[SiOMeH]_n$—$[SiOMe_2]_m$—$SiMe_3$, where n is an integer ranging from 1 to about 200, m is an integer ranging from 0 to about 200 and Me is methyl. Typically, n is an integer ranging from about 30 to about 70 and m is 0. Other potentially useful silicone compounds having a reactive site are the hydridosilsesquioxanes described in U.S. Pat. No. 6,572,974. Additional examples of silicones can be represented by the formula

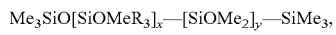
Me$_3$SiO[SiOMeR$_3$]$_x$—[SiOMe$_2$]$_y$—SiMe$_3$, where x and y are integers independently ranging from 0 to 200, typically up to 100 even more typically up to 50, and R$_3$ is a saturated or unsaturated linear or branched unsubstituted or heteroatom-substituted hydrocarbon containing 1 to about 20 carbon atoms, typically 1 to about 8 carbon atoms. A typical heteroatom is oxygen. Typically R$_3$ is an alkoxy group having the structure

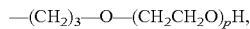
—(CH$_2$)$_3$—O—(CH$_2$CH$_2$O)$_p$H, where p is an integer of 1 to about 25. Typically the number average molecular weight (Mn) of the silicone ranges from about 1,000 to about 10,000, most typically from about 4,000 to about 5,000.

Examples of hydrocarbon wax include solids or liquids at room temperature. Examples of suitable waxes include petroleum wax such as paraffin wax and micro crystalline wax; plant wax such as candelilla wax and carnauba wax; animal wax such as bees wax and lanolin; synthetic hydrocarbon wax, such a Fischer-Tropsch wax and polyethylene wax.

The hydrocarbon wax can additionally be a wax-like material including, without limit, a high molecular weight alcohol, such as stearyl alcohol and 12-hydroxystearic acid; or a high molecular weight carboxylic acid. The wax or wax-like material can be used alone or in mixture with one or more other waxes or wax-like materials.

Examples of high molecular weight carboxylic acids include carboxylic acids containing up to about 30 carbon atoms, typically from about 8 to about 30 carbon atoms, more typically from about 10 to about 20 carbon atoms. The carboxylic acid can be saturated or unsaturated, straight chain, branched chain or cyclic and can include one or more carboxyl groups (COOH). Preferably, the carboxylic acid has two or more carboxyl groups. Mixtures of carboxylic acids are contemplated as within the scope of this invention. Examples of useful high molecular weight carboxylic acids include, without limit, lauric acid, stearic acid, isostearic, oleic acid, linoleic acid and mixture thereof.

Additional examples of carboxylic acids include low molecular weight carboxylic acids that can be used alone or in combination with the high molecular weight carboxylic acid and/or the hydrocarbon wax. Typically low molecular weight carboxylic acids contemplated can contain up to about 8 carbon atoms, more typically from 1 to about 8 carbon atoms, even more typically, from about 2 to about 6 carbon atoms. The low molecular weight carboxylic acid can be saturated or unsaturated, straight chain, branched chain or cyclic and can include one or more carboxyl groups (COOH). Preferably, the carboxylic acid has two or more carboxyl groups. Mixtures of carboxylic acids are contemplated as within the scope of this invention. Typical examples of the low molecular weight carboxylic acid include, without limit, malonic acid, fumaric acid, maleic acid, benzoic acid, phthalic acid, and mixture thereof.

The amount of the compounds used to surface treat the pigment particles cover a fairly wide range which could be easily optimized by a person of skill in the art. However, the amount generally can range from about 0.01 to about 12 wt %, based on the total weight of the pigment, preferably about 0.1 to about 6 wt %, more preferably about 0.5 to about 2 wt %, and most preferably about 1 wt %.

The process of surface treating pigment particles is not especially critical and may be accomplished in a number of ways including techniques more fully described in U.S. Pat. Nos. 5,889,090; 5,607,994; 5,631,310; and 5,959,004. The pigment can be surface treated with a single compound or it can be treated two or more times with any number of compounds. The pigments may also contain ingredients added thereto to improve functional characteristics such as dispersibility or durability. Thus, by way of example, but not limited thereto, the pigment may contain additives and/or inorganic oxides such as aluminum, silicon or tin as well as triethanolamine, trimethylolpropane, phosphates, and phosphites.

An additional example of a water-bearing inert particulate material is "silanized" titanium dioxide pigment surface treated with either at least one silane or a mixture of at least one silane and one polysiloxane.

The chain extender composition can be a mixture of one or more of the chain extending agents and one or more of the water-bearing inert particulate materials or one or more water-bearing particulate materials surface treated with one or more chain extending agents or the chain extender composition can be a combination thereof.

Chain extending agents have been added to thermoplastic condensation polymers. However, while not wishing to be limited by theory, the problem of molecular weight loss in high temperature processing of thermoplastic condensation polymers thought to be discovered is the moisture associated with a variety of common fillers and pigments (the water-bearing particulate material), such as residual moisture associated with titanium dioxide. Examples, without limitation, of the source of water can be water residual from the synthesis of the particulate material, water of hydration, water which is chemically bound to the particulate material or water which is absorbed onto at least the surface of the particulate material. The water, in combination with the acid end groups of the condensation polymer and high temperatures during polymer processing, such as extrusion, is thought to contribute to chain breakage in the condensation polymer. The discovered solution keeps the chain extending agent in close association to the water-bearing particulate material so that when they are dispersed into the polymer melt the chain extending agent is closest to what is considered to be a key source of moisture that contributes to molecular weight loss during polymer processing.

The chain extender composition can be prepared as a liquid-solid, a solid-solid mixture or a dispersion of individual particles of the chain extending agent and the water-bearing particulate material.

The chain extender composition can be prepared by contacting solid pigment with neat chain extending agent in liquid form or dissolved in a solvent or prepared as a slurry before contacting pigment, in dry or slurry form. In addition, the pigment may be immersed in the chain extending agent, if liquid, or a solution of chain extending agent can be used. Other methods of include spraying the pigment with the chain extending agent or a solution of the chain extending agent; injecting the treating compound or a solution of the compound into an air or steam stream pigment fluid energy mill. It should be recognized that these methods are provided for guidance only, and not intended as a limitation. Similar processes can be employed for any water-bearing inert particulate material. These preparation techniques are especially suitable for titanium dioxide but would be equally applicable to any water-bearing particulate material utilized in thermoplastic condensation polymers.

One useful method for making the chain extender composition is by metering a liquid composition comprising the chain extending agent into a flow restrictor and injecting a gas stream through the flow restrictor concurrently with the metering of the liquid to create a zone of turbulence at the outlet of the flow restrictor thereby atomizing the liquid composition and adding the particulate material to the zone of turbulence concurrently with the metering of the liquid and the injection of the gas to mix the particulate material with the atomized liquid composition. Such processes are well known and disclosed in WO 97/07879; WO 02/102167; WO 02/10293; U.S. Pat. No. 4,303,702 and U.S. Pat. No. 4,083, 946 which are each incorporated by reference in their entireties.

An additional method for making the chain extender composition is by dry mixing a solid chain extending agent with the water-bearing particulate material. In this embodiment it may be advantageous to grind the chain extending agent into a fine powder, for example, without being limited thereto, a powder having particles which of an mean particle size below about 200 microns, typically below about 160 microns and even smaller particles may be suitable.

In one embodiment, the invention relates to a polymer composition which can be used as a masterbatch. When used as a masterbatch, the polymer can provide both opacity and viscosity attributes to a polymer blend that can be utilized to form shaped articles.

The chain extender composition of this invention may be employed in any of a wide variety of thermoplastic condensation polymer compositions which are subjected to high temperature processing, a variety of which high temperature processing techniques are well known in the thermoplastic industry. For example, the composition can be used in extrusion of sheets, films and shapes; coextrusion; blown film; injection molding; insert molding; isostatic molding; compression molding; rotomolding; thermoforming; sputter coating; lamination; wire coating; calendaring; and welding. The invention is particularly suitable for "melt-processing," wherein a polymer is extruded or otherwise converted into a shaped article through a stage which involves obtaining the polymer in a molten state.

Thermoplastic condensation polymers which are suitable for use in this invention include, by way of example but not limited thereto, vinyl acetate; polyvinyl esters such as alkyds; amino resins; polyamides; polyamideimides; polyetherimides; polyurethanes; polycarbonates; polyesters such as polyethylene terephthalate, and polybutylene terephthalate, and poly(cyclohexylene-dimethylene terephthalate) and chlorinated polyesters, and aromatic polyesters; polyethers; polyacetals; polyimides; polyphenylene oxides; amino resins, such as urea-formaldehydes; polyalkylene amides, and unsaturated polyesters modified with fatty acids. Mixtures of any of the foregoing can also be used and any of the foregoing are also contemplated as the first or second polymer or both.

In one embodiment of this invention a first polymer, referred to as a "masterbatch", containing the chain extender composition, is prepared by melt blending the polymer and the chain extender composition.

The masterbatch is then melt blended with a second polymer referred to as a "let down" polymer.

The first and second polymers can be the same or different. Typically, the first and second polymers are highly compatible. The second polymer is usually free of the additives used in the first polymer (such as the chain extender composition) but can contain one or more other additives (such as an antiblock agent or antioxidant) which can be added by melt blending from a masterbatch containing the polymer and such other additive.

While the amount of first polymer can vary depending on the polymer or mixture of polymers employed, the first polymer is typically present in an amount of from about 10 to about 60 wt. %, typically about 20 to about 50 wt %, even more typically about 30 to about 40 wt. %. based on the total weight of the first and second polymers.

The amount of the chain extending agent will depend upon the type of chain extending agent, the amount and type of water-bearing inert particulate material, and the type of polymer. However useful amounts of chain extending agent can range from about 0.1 wt. % to about 10 wt. %, typically about 0.25 wt. % to about 3 wt. %, even more typically about 0.5 wt. % to about 1.5 wt. %, based on the total weight of the polymer composition, including additives.

The amount of chain extender composition present in the polymer composition and shaped polymer article will vary depending on the end use application. The amount of chain extender composition can range from about 0.1% by weight to about 80% by weight based on the total weight of the polymer composition, typically from about 2 wt. % to about 50 wt. %, more typically from about 2 wt. % to about 20 wt. %. In a masterbatch the amount of chain extender composition in the polymer ranges from about 30 to about 90 wt %, based on the total weight of the polymer, preferably, about 50 to about 80 wt %.

Other Additives

A wide variety of other additives may be used as necessary, desirable or conventional for thermoplastic condensation polymers. Such additives include inorganic pigments, viscosity modifiers, catalysts, initiators, antioxidants (e.g., hindered phenol such as butylated hydroxytoluene), blowing agent, ultraviolet light stabilizers (e.g., hindered amine light stabilizers or "HALS"), UV light absorbers, heat stabilizers (such as phosphites or phenolics), lubricants, interfacial agents, organic pigments including tinctorial pigments, plasticizers, antiblocking agents (e.g. clay, talc, calcium carbonate, silica, silicone oil, and the like) leveling agents, flame retardants, smoke depressants, cross-linking agents, anti-cratering additives, fillers, processing aids and the like.

Examples of flame retardants and smoke depressants include halogenated aromatic compounds, polyhydrated inorganic compounds, e.g. alumina trihydrate, magnesium or calcium hydroxides, antimony compounds, barium sulphate, phosphorus-containing compounds, borates, and melamine derivatives. Some combinations of such additives are known to act in a synergistic manner. Flame retardants and smoke depressants typically are used in amounts of about 1 to 50% by weight, preferably 2 to 45% by weight based on the total weight of the composition.

Other additives including silicon rubbers and oils, slip agents, antistatic compounds, chemical blowing agents, pigments, dyes and nucleating agents, may be used in amounts of about 0.01 to about 5% by weight, especially about 0.1 to about 3% by weight based on the total weight of the composition.

Examples of fillers that may be used as or in addition to any fillers that may be the water-bearing particulate material include, for example without limit, fillers in the form of powders, platelets, fibers, spheres, microspheres or in acicular form. More specifically, powdery, platen, spherical and/or acicular inorganic compositions such as silica, alumina, silicate-alumina, talc, metasilicates, carbonates, dolomite, diatomaceous earth, clay, kaolin, lithopone, barium sulfate, quartz, glass, mica, graphite, carbon black, molybdenum disulphide, gypsum, red iron oxide, zinc sulfide, graphite, talc, wollastonite, silicon dioxide, calcium carbonate, polytetrafluoroethylene, glass beads, metal oxide particles, which are different from the metal oxide of this invention, such as zinc oxide or titanium dioxide, and fiber reinforcements such as ceramic fibers, aramid fibers, potassium titanate fibers, glass fibers, stainless steel fibers, copper, boron and carbon fibers. The particular filler selected will depend on the effect desired. Mixtures of two or more fillers may be used. In addition, the fillers may be treated with a silane coupling agent or other coupling agent may be used or fatty acids such as but not limited to stearic acid.

Toughening agents or impact modifiers can be used and examples include, without limit, copolymers formed from ethylene and/or propylene, and diene rubbers, all of which may or may not be grafted with for example acidic functionality. Toughening agents are generally used in amounts of about 1 to about 45% by weight, especially about 4 to about 35% by weight, based on the entire weight of the composition.

Polymer processing aids can be employed in various melt-processing procedures to ease processing-related problems due to inherent viscoelastic properties of the polymer being melt-processed. Polymer processing aids can comprise fluoropolymers, including elastomeric fluoropolymers (i.e., fluoroelastomers or amorphous fluoropolymers) and thermoplastic fluoropolymers (i.e., semi-crystalline fluoropolymers). Fluoroelastomers are fluoropolymers that are normally in the fluid state at room temperature and above, i.e., fluoropolymers which have glass transition ($T_g$) values below room temperature (e.g., 25° C.) and which exhibit little or no crystallinity at room temperature.

Fluoroelastomers having a fluorine to hydrogen ratio of at least 1:1.5 can be used.

Fluoropolymers for example, without limitation thereto, are formed from fluorinated monomers which may be polymerized or copolymerized to yield suitable fluoroelastomers include vinylidene fluoride, hexafluoropropylene, chlorotrifluoroethylene, tetrafluoroethylene and perfluoroalkyl perfluorovinyl ethers. Specific examples of fluoroelastomers include copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and hexafluoropropylene or 1- or 2-hydropentafluoropropylene; and copolymers of tetrafluoroethylene, propylene and, optionally, vinylidene fluoride, all of which are known in the art.

Thermoplastic (semi-crystalline) fluoropolymers which may be used in the process of this invention include, but are not limited to, poly(vinylidene fluoride), homopolymers and copolymers of tetrafluoroethylene (such as Teflon® FEP fluorocarbon resin), and copolymers of tetrafluoroethylene and hexafluoropropylene, optionally with vinylidene fluoride.

The fluoropolymer can be derived from one or more fluorinated monomers, selected from the group consisting of vinylidene fluoride, hexafluoropropylene, chlorotrifluoroethylene, tetrafluoroethylene and perfluoroalkyl perfluorovinyl ethers.

The processing aid may also contain one or more non-fluorinated monomeric or polymeric components including, without limit, caprolactone and polyester polyol.

Any melt compounding techniques, known to those skilled in the art may be used to combine the chain extender composition with the thermoplastic condensation polymer. Generally, the chain extender composition and the thermoplastic condensation polymer are brought together and then mixed in a blending operation, such as dry blending, that applies shear to the polymer melt to form a polymer masterbatch. The melt-processible polymer is usually available in the form of powder, granules, pellets or cubes. Methods for dry blending include shaking in a bag or tumbling in a closed container. Other methods include blending using agitators or paddles. The chain extender composition may be co-fed using screw devices, which mix the chain extender composition and the thermoplastic condensation polymer together before the polymer reaches a molten state.

After mixing or blending with the chain extender composition, the thermoplastic condensation polymer is melt blended, using any methods known in the art, including screw feeders, kneaders, high shear mixers, blending mixers, and the like. Typical methods use Banbury mixers, single and twin screw extruders, and hybrid continuous mixers.

Processing temperatures depend on the polymer and the blending method used and are well known to those skilled in the art. The intensity of mixing depends on the degree of softening desired.

The thermoplastic condensation polymer composition produced by the process of this invention is useful in the production of shaped articles. A shaped article is typically produced by melt blending the condensation polymer which comprises a first melt-processible polymer, with a second melt-processible polymer to produce the polymer that can be used to form the finished article of manufacture. The first and second polymers are melt blended, using any means known in the art, as disclosed hereinabove. In this process, twin screw extruders are commonly used. Co-rotating twin screw extruders are available from Werner and Pfleiderer. The melt blended polymer is extruded to form a shaped article.

This invention is particularly suitable for producing shaped articles such as tubing, pipes, wire coatings, and films, including but not limited to blown films.

In one embodiment, the invention herein can be construed as excluding any element or process step that does not materially affect the basic and novel characteristics of the composition or process. Additionally, the invention can be construed as excluding any element or process step not specified herein.

EXAMPLES

Test Procedure Used in Examples

Melt or dilute solution viscosity were utilized. The apparent or intrinsic viscosities obtained from the testing are indicators of polymer molecular weight. The higher the value the higher one can assume the molecular weight to be within a given series.

The apparent viscosity was measured using a capillary rheometer (Dynesco LCR 7000) in accordance with ASTM D3835. Temperatures and shear rates utilized for a given sample are documented with the data.

Intrinsic viscosity was measured according to ASTM D2857 utilizing a 50/50 solvent blend of trifluoroacetic acid/dichloromethane at ambient temperature. After a given material was dissolved, it was filtered and the sample evaluated. A model Y-900 Vicotek forced flow viscometer was utilized.

Control Example 1

Fifty (50) weight percent of $TiO_2$ (DuPont Ti-Pure® R-104) was blended with 50 weight percent of polyethylene terephthalate (PET) (DuPont Crystar® 3934) having an intrinsic viscosity of 0.67 dL/g. The blending was accomplished using a 9-barrel 30-mm twin screw extruder equipped with gravimetric feeders having a vent port in zone 8. The barrels were set to 275° C., the die at 275° C. and screw speed was 150 rpm. The TiO$_2$ blend was fed into the extruder in zone 5 through the use of a single screw side stuffer. The PET was fed in the rear in zone 1. Quenching was accomplished using a water bath. The strand was cut into pellets using a standard rotating blade cutter.

The sample was evaluated using melt rheology at 270° C. The results are presented in Table 1.

Example 2

2000 g of TiO$_2$ (DuPont Ti-Pure® R-104) was blended for with 18 g of Joncryl® ADR 4368 (Johnson Polymers) polymeric chain extender. This was accomplished by adding the ADR 4368 to dry pigment and blending with a V-cone blender fitted with an internal stirring bar (known as an intensifier bar). These blenders are commercially available through suppliers such as Patterson-Kelley. The pigment and ADR 4368 were blended with an intensifier bar at ambient temperature for 10 minutes. The ADR 4368 was ground to a mean particle size of 161 microns prior to blending.

Fifty (50) weight percent of the TiO$_2$ blend was further blended with 50 weight percent of PET (DuPont Crystar® 3934) having an intrinsic viscosity of 0.67 dL/g. The blending was accomplished using the same method as in Example 1.

The sample was evaluated using melt rheology at 270° C. and compared to Example 1. The results are presented in Table 1. The higher apparent viscosity for Example 2 indicates an increase in the molecular weight of that blend versus the control.

TABLE 1

| | Apparent Viscosity @ 270° C. | | |
|---|---|---|---|
| | Shear Rate | | |
| Example No | 500 s$^{-1}$ (Pa * s) | 1000 s$^{-1}$ (Pa * s) | 2000 s$^{-1}$ (Pa * s) |
| 1 | 123.8 | 107.6 | 91.4 |
| 2 | 194.1 | 161 | 130 |

Control Example 3

Fifty (50) weight percent of TiO$_2$ (DuPont Ti-Pure® R-104) was blended with 50 weight percent of PET (DuPont Crystar® 3934) having an intrinsic viscosity of 0.67 dL/g. The blending was accomplished using the same method as in Example 1 except that the TiO$_2$ was fed in zone 1 of the extruder.

The sample was evaluated using melt rheology. The results are presented in Table 2.

Example 4

1590 g of PET (DuPont Crystar® 3934) having an intrinsic viscosity of 0.67 dL/g was blended with 18 g of Joncryl® ADR 4368 (Johnson Polymers) polymeric chain extender by shaking the two materials for 10 minutes in a plastic bag.

Fifty (50) weight percent of the TiO$_2$ (DuPont Ti-Pure® R-104) was further blended with 50 weight percent of the PET blend using the same method as in Example 3.

The sample was evaluated using melt rheology at 270° C. and compared to Example 3. The results are presented in Table 2.

Example 5

2000 g of TiO$_2$ (DuPont Ti-Pure® R-104) was blended with 18 g of Joncryl® ADR 4368 (Johnson Polymers) polymeric chain extender using the same method as in Example 2. The ADR 4368 was ground to a mean particle size of 161 microns prior to blending.

Fifty (50) weight percent of the TiO$_2$ blend was further blended with 50 weight percent of PET (DuPont Crystar® 3934) having an intrinsic viscosity of 0.67 dL/g. The blending was accomplished using the same method as in Example 3.

The sample was evaluated using melt rheology at 270° C. and compared to Examples 3 and 4. The results are presented in Table 2.

TABLE 2

| | Apparent Viscosity @ 270° C. | | |
|---|---|---|---|
| | Shear Rate | | |
| Example No | 500 s$^{-1}$ (Pa * s) | 1000 s$^{-1}$ (Pa * s) | 2000 s$^{-1}$ (Pa * s) |
| 3 | 76.9 | 66.3 | 51.4 |
| 4 | 90.2 | 78.5 | 66.9 |
| 5 | 107.2 | 90.5 | 76 |

The increase in apparent viscosity of example 5 versus example 4 indicates improved efficiency of having the chain extender incorporated with the TiO$_2$ versus having it incorporated with the polymer.

Control Example 6

Fifty (50) weight percent of TiO$_2$ (DuPont Ti-Pure® R-104) was blended with 50 weight percent of PET (DuPont Crystar® 5005) having an intrinsic viscosity of 0.83 dL/g. The blending was accomplished using the same method as in Example 1.

The sample was evaluated using melt rheology. The results are presented in Table 3.

Example 7

2000 g of TiO$_2$ (DuPont Ti-Pure® R-104) was blended for 10 minutes with 18 g of Joncryl® ADR 4368 (Johnson Polymers) polymeric chain extender using the method of Example 2. The ADR 4368 was ground to an approximate mean particle size of 161 microns prior to blending.

Fifty (50) weight percent of the TiO$_2$ blend was further blended with 50 weight percent of PET (DuPont Crystar® 5005) having an intrinsic viscosity of 0.83 dL/g. The blending was accomplished using the same method as in Example 1.

The sample was evaluated using melt rheology at 270° C. and compared to Example 6. The results are presented in Table 3. The higher apparent viscosity for Example 7 indicates an increase in the molecular weight of that blend versus the control.

TABLE 3

Apparent Viscosity @ 270° C.

| | Shear Rate | | |
|---|---|---|---|
| Example No | 500 s$^{-1}$ (Pa * s) | 1000 s$^{-1}$ (Pa * s) | 2000 s$^{-1}$ (Pa * s) |
| 6 | 106.9 | 96.8 | 85.8 |
| 7 | 158.6 | 134.8 | 114.1 |

Control Example 8

Fifty (50) weight percent of TiO$_2$ (DuPont Ti-Pure® R-104) was blended with 50 weight percent of polybutylene terephthalate (PBT) (DuPont Crastin® 6131C). The blending was accomplished using the same method as in Example 1, except that all zones and the die were set to 250° C.

The sample was evaluated using melt rheology at 250° C. The results are documented in Table 4.

Example 9

2000 g of TiO$_2$ (DuPont Ti-Pure® R-104) was blended for 10 minutes with 18 g of Joncryl® ADR 4368 (Johnson Polymers) polymeric chain extender using the method of Example 2. The ADR 4368 was ground to an approximate mean particle size of 161 microns prior to blending.

Fifty (50) weight percent of the TiO$_2$ blend was further blended with 50 weight percent of PBT (DuPont Crastin® 6131C). The blending was accomplished using the same method as in Example 8.

The sample was evaluated using melt rheology at 250° C. and compared to Example 8. The results are presented in Table 4. The higher apparent viscosity for Example 9 indicates an increase in the molecular weight of that blend.

TABLE 4

Apparent Viscosity @ 250° C.

| | Shear Rate | | |
|---|---|---|---|
| Example No | 500 s$^{-1}$ (Pa * s) | 1000 s$^{-1}$ (Pa * s) | 2000 s$^{-1}$ (Pa * s) |
| 8 | 303.7 | 247.8 | 192.4 |
| 9 | 572.2 | 433.3 | 317.9 |

Control Example 10

Fifty (50) weight percent of TiO$_2$ (DuPont Ti-Pure® R-104) was blended with 50 weight percent of PET (DuPont Crystar® 3934) having an intrinsic viscosity of 0.67 dL/g. The blending was accomplished using the same method as in Example 1.

The sample was evaluated using intrinsic viscosity. The results are presented in Table 5.

Example 11

2000 g of TiO$_2$ (DuPont Ti-Pure® R-104) was blended for 10 minutes with 20 g of Epon™ Resin 1031 (Resolution Performance Products) chain extender using the method of Example 2.

Fifty (50) weight percent of the TiO$_2$ blend was further blended with 50 weight percent of PET (DuPont Crystar® 3934) having an intrinsic viscosity of 0.67 dL/g. The blending was accomplished using the same method as in Example 1.

The sample was evaluated using intrinsic viscosity and compared to Example 10. The results are presented in Table 5. The higher intrinsic viscosity for Example 11 indicates an increase in the molecular weight of that blend versus the control.

TABLE 5

Intrinsic Viscosity

| Example No | Intrinsic Viscosity (dL/g) |
|---|---|
| 10 | 0.45 |
| 11 | 0.57 |

Control Example 12

Fifty (50) weight percent of TiO$_2$ (DuPont Ti-Pure® R-108) was blended with 50 weight percent of PET (DuPont Crystar® 3934) having an intrinsic viscosity of 0.67 dL/g. The blending was accomplished using the same method as in Example 1.

The sample was evaluated using intrinsic viscosity. The results are presented in Table 6.

Example 13

2000 g of TiO$_2$ (DuPont Ti-Pure® R-104) was blended for 10 minutes with 20 g of Epon™ Resin 1031 (Resolution Performance Products) chain extender using the method of Example 2.

Fifty (50) weight percent of the TiO$_2$ blend was further blended with 50 weight percent of PET (DuPont Crystar® 3934) having an intrinsic viscosity of 0.67 dL/g. The blending was accomplished using the same method as in Example 1.

The sample was evaluated using intrinsic viscosity and compared to Example 12. The results are presented in Table 6. The higher intrinsic viscosity for Example 13 indicates an increase in the molecular weight of that blend versus the control.

TABLE 6

Intrinsic Viscosity

| Example No | Intrinsic Viscosity (dL/g) |
|---|---|
| 12 | 0.50 |
| 13 | 0.55 |

Control Example 14

Twenty-five (25) weight percent of TiO$_2$ (DuPont Ti-Pure® R-105 coated with 1% methylhydrogen siloxane) was blended with 75 weight percent of polycarbonate (PC) (GE Plastics Lexan® 1110R). The blending was accomplished using the same method as in Example 1, except that all zones and the die were set to 300° C.

The sample was evaluated using melt rheology at 300° C. The results are presented in Table 7.

Example 15

1000 g of TiO$_2$ (DuPont Ti-Pure® R-105 coated with 1% methylhydrogen siloxane) was blended for 10 minutes with 20 g of Joncryl® ADR 4368 (Johnson Polymers) polymeric chain extender using the method of Example 2. The ADR 4368 was ground to an approximate mean particle size of 161 microns prior to blending.

Twenty-five (25) weight percent of the TiO$_2$ blend was further blended with 750 weight percent of PC (GE Plastics Lexan® 1110R). The blending was accomplished using the same method as in Example 13.

The sample was evaluated using melt rheology at 300° C. and compared to Example 14. The results are presented in Table 7. The higher apparent viscosity for Example 15 indicates an increase in the molecular weight of that blend versus the control.

TABLE 7

| | Apparent Viscosity @ 300° C. | | |
| --- | --- | --- | --- |
| | | Shear Rate | |
| Example No | 500 s$^{-1}$ (Pa * s) | 1000 s$^{-1}$ (Pa * s) | 2000 s$^{-1}$ (Pa * s) |
| 14 | 155.8 | 140.2 | 121.2 |
| 15 | 172.8 | 159.9 | 142 |

Example 16

1000 g of TiO$_2$ (DuPont Ti-Pure® R-104) was blended for 10 minutes with various weight percent amounts, based on the total weight of the TiO$_2$, of Joncryl® ADR 4368 (Johnson Polymers) polymeric chain extender using the method of Example 2. The weight percent amounts of the polymer chain extender are reported in Table 8 herein below. The ADR 4368 was ground to an approximate mean particle size of 161 microns prior to blending.

Ten (10) weight percent of the TiO$_2$ blend was further blended with 90 weight percent of PBT (DuPont Crastin® 6131C). The blending was accomplished using the same method as in Example 8.

The samples were evaluated using melt rheology at 250° C. and compared. The results are presented in Table 8. The higher apparent viscosity for all samples containing the Joncryl® (ADR 4368 indicates an increase in the molecular weight of those blends.

TABLE 8

| | Apparent Viscosity @ 250° C. | | |
| --- | --- | --- | --- |
| wt. % Joncryl ® | | Shear Rate | |
| ADR 4386 added to TiO$_2$ | 500 s$^{-1}$ (Pa * s) | 1000 s$^{-1}$ (Pa * s) | 2000 s$^{-1}$ (Pa * s) |
| 0 | 164 | 140 | 116 |
| 2 | 199 | 168 | 134 |
| 3 | 227 | 188 | 147 |
| 5 | 269 | 216 | 164 |

The description of illustrative and preferred embodiments of the present invention is not intended to limit the scope of the invention. Various modifications, alternative constructions and equivalents may be employed without departing from the true spirit and scope of the appended claims.

What is claimed is:

1. A method for forming a thermoplastic condensation polymer susceptible to molecular weight loss during a heated process, comprising:

metering a liquid composition comprising a chain extending agent into a flow restrictor and injecting a gas stream through the flow restrictor to create a zone of turbulence at the outlet of the flow restrictor thereby atomizing the liquid composition and adding a water-bearing particulate material to the zone of turbulence concurrently with metering of the liquid composition and the injection of the gas to mix the particulate material with the atomized liquid composition to form a chain extender composition;

introducing the thermoplastic condensation polymer to an extruder;

adding to the thermoplastic condensation polymer the chain extender composition; and heat processing the thermoplastic condensation polymer in the extruder, wherein adding the chain extender composition reduces molecular weight loss of the thermoplastic condensation polymer during the heat processing.

2. The method of claim 1 further comprising pelletizing the condensation polymer after heat processing.

3. The method of claim 1 further comprising adding the heat processed condensation polymer as a masterbatch into a thermoplastic melt.

4. The method of claim 1 further comprising forming the condensation polymer into a container, fiber or film.

5. The method of claim 1 in which the thermoplastic condensation polymer is selected from the group consisting of vinyl acetate; polyvinyl ester, amino resin; polyamide; polyamideimide; polyetherimide; polyurethane; polycarbonate; polyester; polyphenylene oxides; amino resins; and combinations thereof.

6. The method of claim 1 in which the water-bearing particulate material is titanium dioxide.

7. The method of claim 1 in which the chain extending agent is selected from the group consisting of an epoxy compound, acrylic acid-derived polymer and copolymer, methacrylic acid-derived polymer and copolymer, polyol, multifunctional acid anhydride, polyacid, polyamine, isocyanate, phosphate ester, aziridine, oxazoline, multivalent metal compound wherein the metal has a valence of not less than 2, phosphite ester and combinations thereof.

8. The method of claim 1 in which chain extending agent is selected from the group consisting of a reaction product of epichlorohydrin and bisphenol-A, a tetraglycidyl ether of tetraphenolethane and an epoxy-modified styrene acrylic polymer and combinations thereof.

* * * * *